United States Patent Office

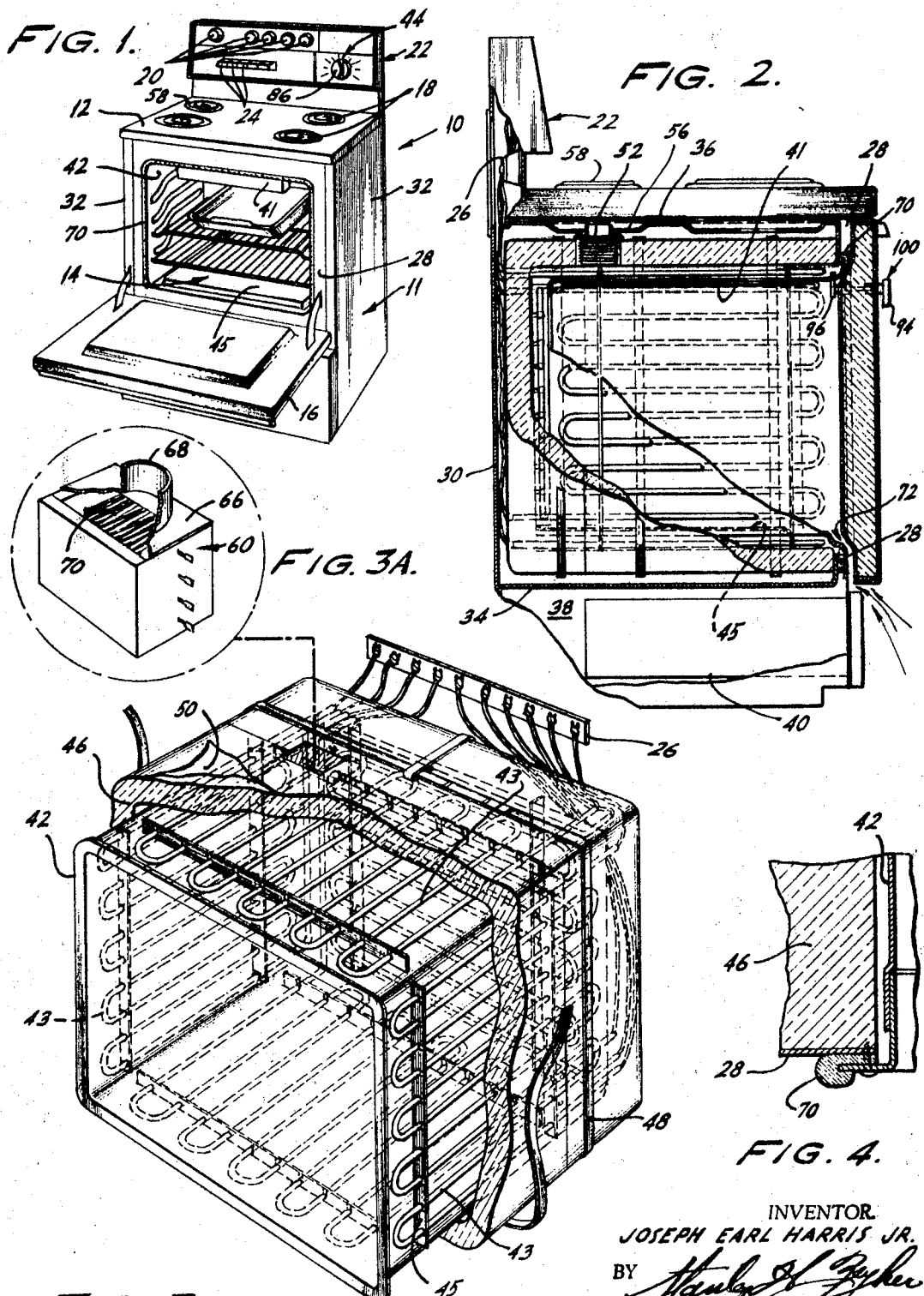

3,459,923
Patented Aug. 5, 1969

---

3,459,923
APPARATUS FOR HEAT-CLEANING OVENS
Joseph Earl Harris, Jr., Oxford, Ohio, assignor to Philco-Ford Corporation, Philadelphia, Pa., a corporation of Delaware
Filed Sept. 27, 1965, Ser. No. 490,583
Int. Cl. H05b 3/02
U.S. Cl. 219—480                                           2 Claims

---

ABSTRACT OF THE DISCLOSURE

A cooking oven comprising an outer shell, and an oven liner housed within the outer shell and having top, bottom, side, and rear walls, and a forward opening. A heat insulated door is operably associated with the opening. A plurality of wall heating means are provided, each of which is individual to and associated with a corresponding one of the liner walls, and adapted to bring the temperature of the associated wall within the self cleaning range. Energization of the individual heating means provides for cleaning of the associated walls selectively.

---

This invention relates to the oven-cleaning art and more particularly to a novel method of and means for pyrolytically cleaning food soils from interior surfaces of cooking ovens.

Current approaches to the problem of heat-cleaning the oven liner require that the temperature of the oven cavity be raised above the normal cooking temperature of about 550° F. maximum to a heat cleaning temperature in the range of from 750° F. to 950° F. It is necessary that the oven be maintained at that temperature for a protracted period of time to insure complete burn-off of all food soils from the liner walls. The present practice is to clean all of the liner walls simultaneously, utilizing heating elements employed for normal cooking operations. This practice necessitates bringing the thermal mass of the entire liner and oven cavity up to pyrolytic temperature. Not only is this approach time consuming, as a result of the thermal mass involved in each heat cleaning operation, but it often results in consumption of excessive power and performance of unnecessary work since all surfaces of the liner do not always require cleaning at the same time. Moreover, by using conventional heating elements within the oven cavity as the energy source, heat-cleaning is not carried out in the most efficient manner.

It also has been found that present heat-cleaning approaches necessitate the use of forced air ventilation of the outer shell and the use of specially constructed duct work, in addition to requiring improved heat insulation of the oven liner and special gasketing of the oven door, all in an effort to prevent overheating of exterior range surfaces.

Accordingly, it is a general object of the present invention to provide a novel and improved method of and means for pyrolytically cleaning food soils from the walls of an oven liner which overcomes the above and other deficiencies and limitations of the prior art.

Another and more particular object of the present invention is the provision of heat-cleaning means, and a method of operation which eliminate the need for forced air ventilation of the oven shell.

Still another object of the invention is the provision of means permitting heat-cleaning of inner wall surfaces of an oven selectively and individually.

A still further object of the invention is the provision of a method of and means for heat-cleaning which permits the removal of food soils in minimum time with maximum efficiency.

These and other objects within contemplation will be more readily understood by reference to the accompanying detailed description and drawings, in which:

FIGURE 1 is a perspective showing of a range embodying the present invention;

FIGURE 2 is a sectional elevational view, partially broken away, showing constructional details of the invention as embodied in the range shown in FIGURE 1 and taken along the cutting plane 2—2 of FIGURE 1;

FIGURE 3 is a perspective view showing further details of the internal construction of the range;

FIGURE 3A is an enlarged sectional detail showing a catalytic oxidizing unit of the type preferably used in removing smoke and odors resulting from pyrolytic incineration of food soils by practice of the present invention;

FIGURE 4 is an enlarged fragmentary showing of the simplified form of door seal made possible by practice of the present invention.

Figure 5:
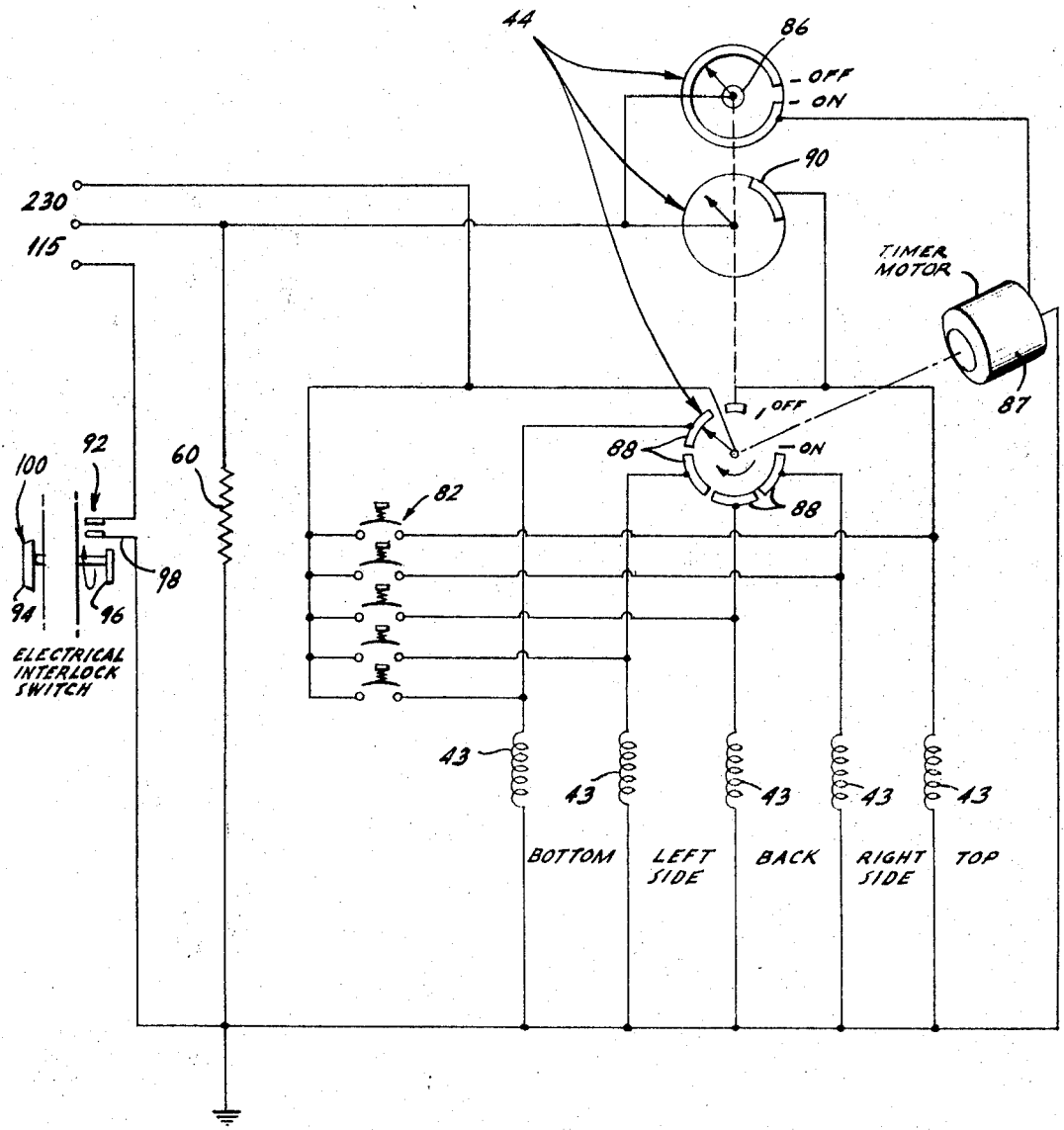
FIGURE 5 is a schematic diagram of the range electrical control system.

In the achievement of the aforementioned and other objectives there is provided a metal oven liner the outer surfaces of which are each equipped with individual, selectively energizable heating elements each maintained in high heat exchange relation with the surface with which it is associated. By this arrangement interior surface portions of the liner may be selectively and individually heat-cleaned in accordance with actual needs. Moreover, it has been found that heat-cleaning of the liner walls individually and sequentially permits pyrolysis of food soils to be carried out in minimal time and without excessive heating of exterior oven walls, while at the same time permitting the use of substantially conventional insulating structure and without the need for special forced air cooling means and associated, specially constructed duct work. Furthermore, the minimization of oven temperature during the heat-cleaning cycle made posible by this construction and method of operation permits the use, where desirable, of a glass door-window, a feature not available on current self-cleaning ovens.

Referring to the drawing there is shown an electric cooking range 10 comprising cabinet structure 11 carrying a substantially horizontal top surface 12 and bounding an oven cavity 14 provided with a heat insulated access door 16. The top surface 12 is equipped with open-type surface heating elements 18 supported within apertures provided in the surfaces. Controls 20 for the surface elements and oven are carried by a back splash 22 mounted at the rear of surface 12. Push buttons 24 are also mounted on the back splash to permit selective energization by the operator of individual heat-cleaning coils associated with individual liner surfaces. A timer 23 is also provided to permit automatic sequencing of the cleaning coils in performance of a predetermined cleaning cycle. The wiring associated with push buttons 24, timer 23, and controls 20 is housed within the hollow structure of back splash guard 22 and communicates with a common terminal board 26 mounted in the rear of the oven and from which connection is made, in conventional fashion, to the individual heating elements. The cabinet or oven shell 11 comprises a front wall 28, a rear wall 30, a pair of side walls 32, a bottom wall 34 and a top wall 36. A storage area 38 is formed at the bottom of the cabinet within which is disposed a removable drawer 40.

The oven cavity 14 is defined by a metal liner 42 which is arranged in spaced relation to and thermally insulated from the oven shell 11. The interior surfaces of the liner may be finished in any conventional manner. For purposes of the present discussion they are assumed to be porcelainized. The internal construction of the range is shown in FIGURES 2 and 3. As is conventional practice a removable broiling unit 41 is disposed in the upper portion of the oven cavity and a removable bake unit 45 is positioned at the bottom thereof. In accordance with the invention each of the outer surfaces of the liner is overlaid with a sinuated heating coil 43 capable of individual and selective energization either through manual activation of one or the other of push buttons 24 or, through sequential activation of the coils by operation of timer 44. Preferably the coils 43 are the tubular sheath enclosed type. As best seen in FIGURE 3, each coil is maintained in close thermal coupling with associated liner surface portions by means of suitably apertured spacing bars 45. These bars serve to position the coils in spaced relation to outer surfaces of the liner and in as close thermal coupling therewith as is possible without causing crazing of interior porcelainized surfaces of the liner. When using 230 volt-3000 watt coils, a spacing of ⅛ inch between coil and liner was found adequate to prevent crazing while still providing the desired thermal coupling. Since the normal running temperature of such a coil is approximately 1800° F. its placement in direct contact with the liner is not feasible. The arrangement while providing optimum heat transfer consistent with the mentioned objective of preventing crazing of liner surfaces also permits lengthwise movement of the coil resulting from thermal expansion gradients while maintaining the coil in proper spaced relation to the liner. Electrical connection to each of the coils is brought out to terminal board 26 positioned to the rear of the oven and from which location connection is made to push buttons 24 and timer 44 carried by back splash 22.

In order to prevent excessive heating of exterior oven walls during heat cleaning operations and to insure that exterior temperature of the oven is kept below objectional levels, and does not exceed 194° F. in 70° F. ambient air during such operations, insulative means of high thermal impedance is interposed between the liner and oven shell. One constructional arrangement found effective in preventing overheaitng of the oven side walls during heat-cleaning is to encase the liner on all five sides with 1 inch thick batts of heat insulative material such, for example, as fiber glass of 10 pound density secured to the liner by baling straps 48 and arranged to leave a one inch air space between the liner and oven shell. Fibrous glass heat-insulating material of lesser density may also be used in which case the thickness of the layer is increased accordingly. In any event the construction is such as to leave a one inch air space between the insulative covering and the oven shell. In order further to increase the thermal impedance of the arrangement the insulation is overlaid with a sheet of aluminum foil or other suitable reflective material 50.

To provide catalytic oxidation of degradation products produced during pyrolytic cleaning of liner surfaces a passageway or flue 52 is provided between the oven cavity 14 and cooking top 12. The upper portion of the flue terminates at the open well 56 of one of the rear surface units 58 from which location oxidation products are vented to the atmosphere. Disposed within the flue is a catalytic oxidizing unit 60 the detailed construction of which is shown in FIGURE 3A. The unit includes a chamber 62 open at opposite ends to form a duct for passage of the pyrolytically produced degradation products. The chamber is shown as constructed of substantially square side members 64 and retcangular end members 66 provided at the top with a circular transition piece 68. The unit is fabricated from material having low or practically zero conductivity for electricity and heat. The inner surfaces of side members 64 are provided with superposed parallel grooves and the inner surfaces of the end members 66 are similarly provided with grooves aligned with one another to form continuous rings of grooves arounl the inner walls of the chamber. Each side groove receives one side of a gas permeable catalytic element 70 and cooperates with the other grooves of the corresponding ring of grooves to support the element and to space it from similarly support elements in the other grooves. As seen in FIGURE 3A the sinuated catalytic coils span the chamber from wall to wall in both directions. Each catalytic element comprises a substantially flat generally helically shaped coil of catalytic material, preferably comprising a metallic wire which may, for instance, be coated with a suitable catalytically active coating. While the wire and catalyst may be of various suitable materials, it has been found that wire comprised of Nichrome (an alloy of nickel and chromium) coated with platinum black, either with or without aluminum or the like as a carrier or intermediary produces satisfactory results. It has been found that the gases produced during the heat-cleaning cycle can be completely oxidized by use of a 50 watt-110 volt catalytic unit utilizing four tiers of coils disposed in a chamber having a cross sectional area of approximately only four square inches.

Referring to the circuit shown in FIGURE 5, the catalytic unit 60 is energized concurrently with operation of any of the heat-cleaning coils 43. A catalytic temperature of approximately 500° to 700° F. has been found adequate for effecting substantially complete oxidation of all pyrolytically formed degradation products. The gases to be treated are carried by normal convection currents of air which enter by way of an opening provided at the bottom of the oven door, as seen in FIGURE 2, through the catalytic oxidizing unit 60 to the atmosphere. As the gases contact the catalyst, contaminants in the gas, such as vapor-borne smoke and odors, are fully oxidized. In at least some instances the catalytic action contributes to heating of the coils. After treatment the clean gas leaves the oven through the open well of surface unit 58.

As a result of the reduction in oven temperature made possible by the present invention an oven door seal of highly simplified construction may be used. The seal 70 as seen in FIGURES 1 and 4 consist simply of braided asbestos fibers forming a gasket of tadpole-shape cross sectional configuration. In the heat cleaning cycle a controlled influx of ambient air into the oven cavity 14 and through the oxidizing unit 60 is provided for by an opening 72 between the bottom of the oven door and the oven front wall 28 formed by deletion of a sealing gasket along the bottom edge of the oven door. By insuring a constant flow of air into the oven cavity during pyrolysis of the food soils, oxidation of the degradation products, formed during the heat-cleaning process, is maximized. The flow of air also insures that condensation of such products on surfaces of the liner not undergoing heat-cleaning, and which are at a relatively cool temperature, does not occur through entrainment in the moving air stream for transport to the catalytic unit for treatment prior to discharge into the ambient air.

During normal use of the oven in carrying out baking and broiling operations food soils accumulate upon the interior surfaces of the liner and the interior surface of the oven. These food soils are exceedingly difficult to remove by ordinary scrubbing, washing and like actions due to the nature of such food soils.

It has been discovered that the whole complex range of compounds comprising the food soils may be decomposed or degraded by heat during a short time interval by heating the food soils to a temperature in the heat-cleaning range extending from about 750° F. of 950° F., with the production of a substantial range of gaseous degradation products.

By practice of the present invention food soils are removed from individual liner surfaces by the selective energization of heating coils associated with individual ones of the liner surfaces. This may be done manually or by timer operation. In either case it is desirable to heat-clean the top of the liner last since a certain degree of preheating of that surface occurs as a result of previous heat-cleaning operations. This permits a reduction in the energy required to bring that surface to pyrolytic temperature. Assuming that all five surfaces of the liner require cleaning they are treated in accordance with the method of this invention individually and sequentially, starting, for example, with the left hand vertical surface of the liner as seen in FIGURE 3 and proceeding in a clockwise direction with treatment of each of the other sides in turn followed by heat cleaning of the back surface and ending with treatment of the liner top surface. In order to render the heat-cleaning cycle automatic, it may be placed under control of a timer 80. FIGURE 5, which acts to time the wattage input required of each of the individual coils in order to produce the desired pyrolytic temperature of the liner surface with which it is associated. Using 220 volt-3000 watt coils in the contsructional arrangement shown in the drawing, it was found that temperatures in the pyrolytic range could be reached in 15–20 minutes of operation, permitting cleaning of all five surfaces sequentially in a maximum total elapsed time of approximately 100 minutes. During this time the catalytic unit 60 remains energized to insure substantially complete oxidation of the pyrolytically produced degradation products.

Referring to FIGURE 5 the coils 43 may be manually energized selectively by one or the other of push button 24, which on activation thereof energize thermal time switches 82. These switches are designed to provide the required "on" time to insure the liner surface associated with that coil being brought to pyrolytic temperature. Alternatively, the coils may be placed under control of timer 44 by manually rotating dial 86 into the "on" position. This actuates the timer motor 87 causing the timer sequentially to actuate coils 43 in the manner shown. The arcuate length of the individual timer segments 88 determines the length of time the coil associated with that segment remains energized. To prevent excessive temperatures being attained with the oven cavity a suitable time lag is provided between the heat cleaning of individual surfaces as provided for by gaps 89 between segments.

As the timer proceeds in its clockwise rotation the coils 43 are energized sequentially, the coil for heating the top surface being energized last. When the cleaning cycle is carried out in timed sequence the top surface of the liner is preheated by previous heat-cleaning coil associated with the top surface need noly be placed across the 230 volt line for a brief period of time after which it is run at one quarter power by connection to a 115 volt source. The circuit is so arranged that the heating element may not be energized unless the oven door is first closed and locked. One arrangement for achieving this is to provide an electrical interlock switch 92 of the type schematically shown. This switch permits energization of the heat cleaning circuit only when the oven door 16 is closed and locked by rotation of door latch 94. The latch is provided with a cam element 96 which is carried into operative engagement with flexible contact blade 98 closing the interlock switch 92 on rotation of the latch into locking engagement with the oven frame. It is also desirable to insure that the oven door may not be opened while the temperature is within the heat-cleaning range. This may be accomplished by use of thermal latch means, not shown, which are commercially available. The catalytic oxidizing unit 60 is maintained in operation throughout each heat cleaning operation by being connected across the 115 volt line in the manner illustrated.

By the arrangement which has been illustrated and described there is provided an improved method of cleaning interior surfaces of an oven cavity which involves elevating the temperature of the boundary walls selectively and sequentially into the heat cleaning temperature range extending from about 750° F. to about 950° F. By heating of the surface to a temperature within this range for a short period of time food soils adhering to the surface are converted to gaseous degradation products. These products in turn are passed through a catalytic oxidizing unit and thence into the ambient atmosphere.

It has been found that by operating the heat-cleaning cycle in the manner prescribed, the exterior oven side walls never exceed a temperature of 187° F. to 194° F. in 70° F. ambient air. Furthermore, during such periods the temperature of the outer surface of the oven door has been found not to exceed 160° F.

In summary, the invention distinguishes from prior arrangements in that the interior surfaces of selective oven walls are cleaned individually, or in pairs or sets if desired, by sequential energization of electric heating elements located in spaces adjacent the outer surfaces of said walls.

Among the advantages resulting from the reduction in oven heat-cleaning temperature made possible by practice of the present invention is overall simplification of oven ;onstruction, use of simplified oven-sealing means, and the accomplishment of heat cleaning in minimum time with optimum efficiency.

While the invention has been described with particular reference to specific practice and embodiments, it will be understood by those skilled in the art that the apparatus and method of the invention may be changed and modified without departing from the essential scope of the invention as defined in the appended claims.

I claim:

1. An oven comprising: an outer shell; an oven liner housed within said outer shell and having top, bottom, side, and rear walls, and a forward opening; a heat insulated door for said opening and mounted for selective movements between open and closed positions relative thereto; a plurality of wall heating means each of which is individual to and disposed adjacent to and in high heat exchange relation with a corresponding one of said liner walls; and apparatus for effecting self-cleaning of said walls individually, when said front door occupies its closed position, comprising means for energizing the heating means of any selected wall to bring the temperature of said wall within the self-cleaning range.

2. An oven in accordance with claim 1, and further characterized in that said last means includes timer mechanism for selectively energizing the individual heating means, to clean the corresponding walls sequentially.

References Cited

UNITED STATES PATENTS

| | | | |
|---|---|---|---|
| 2,994,760 | 8/1961 | Pecoraro et al. | 219—480 X |
| 2,035,757 | 3/1936 | Ottenstein | 219—407 |
| 3,121,158 | 2/1964 | Hurko | 219—397 |
| 3,041,440 | 6/1962 | Dills | 219—391 X |

BERNARD A. GILHEANY, Primary Examiner

H. B. GILSON, Assistant Examiner

U.S. Cl. X.R.

219—412